(12) United States Patent
Yamazaki et al.

(10) Patent No.: US 8,585,330 B2
(45) Date of Patent: Nov. 19, 2013

(54) CUTTING INSERT

(75) Inventors: Kazuya Yamazaki, Toride (JP); Kenji Sugawara, Toride (JP)

(73) Assignee: Mitsubishi Materials Corporation, Tokyo (JP)

( * ) Notice: Subject to any disclaimer, the term of this patent is extended or adjusted under 35 U.S.C. 154(b) by 218 days.

(21) Appl. No.: 12/737,796

(22) PCT Filed: Aug. 21, 2009

(86) PCT No.: PCT/JP2009/004038
§ 371 (c)(1),
(2), (4) Date: Feb. 17, 2011

(87) PCT Pub. No.: WO2010/021155
PCT Pub. Date: Feb. 25, 2010

(65) Prior Publication Data
US 2011/0142555 A1    Jun. 16, 2011

(30) Foreign Application Priority Data

Aug. 22, 2008   (JP) .................................. 2008-214320
Aug. 11, 2009   (JP) .................................. 2009-186448

(51) Int. Cl.
*B23B 27/16*     (2006.01)

(52) U.S. Cl.
CPC ....................................... *B23B 27/16* (2013.01)
USPC ........................................................ 407/113

(58) Field of Classification Search
USPC ............................... 407/2, 113, 114, 115, 116
IPC ....................................................... B23B 27/16
See application file for complete search history.

(56) References Cited

U.S. PATENT DOCUMENTS

| 5,044,840 | A | | 9/1991 | Fouquer et al. | |
|---|---|---|---|---|---|
| 5,372,463 | A | * | 12/1994 | Takahashi et al. | 407/114 |
| 5,476,346 | A | * | 12/1995 | Lundstrom | 407/114 |

(Continued)

FOREIGN PATENT DOCUMENTS

| EP | 0577573 A1 | 1/1994 |
|---|---|---|
| EP | 1967304 A2 | 9/2008 |

(Continued)

OTHER PUBLICATIONS

International Search Report dated Oct. 13, 2009, issued for PCT/JP2009/004038.

(Continued)

*Primary Examiner* — Daniel Howell
*Assistant Examiner* — Alan Snyder
(74) *Attorney, Agent, or Firm* — Edwards Wildman Palmer LLP

(57) ABSTRACT

The cutting insert is provided with an insert main body, a cutting edge formed at a circumferential edge of the rake face of the insert main body to have a corner edge and two side edges arranged on the both sides thereof, a protrusion portion formed on the rake face, and a pair of convex portions formed on both sides divided by a bisector of the corner edge. Each of the pair of convex portions is provided with a first wall surface facing the corner edge of the cutting edge, and a second wall surface facing the side edge. On the rake face closer to the corner edge than the pair of convex portions, a recess having a rear wall portion which extends so as to cross the bisector between the corner edge and the convex portion is formed.

16 Claims, 7 Drawing Sheets

(56) References Cited

U.S. PATENT DOCUMENTS

| | | |
|---|---|---|
| 5,577,867 A | 11/1996 | Paya |
| 5,743,681 A | 4/1998 | Wiman et al. |
| 5,810,520 A * | 9/1998 | Hintze et al. ............... 407/114 |
| 5,876,145 A | 3/1999 | Datum |
| 2002/0136611 A1* | 9/2002 | Hartlohner ............... 407/114 |
| 2005/0019111 A1* | 1/2005 | Kitagawa et al. ............ 407/113 |
| 2008/0219784 A1* | 9/2008 | Yamazaki et al. ........... 407/114 |
| 2009/0226269 A1 | 9/2009 | Iyori et al. |

FOREIGN PATENT DOCUMENTS

| | | |
|---|---|---|
| JP | 02-131804 A | 5/1990 |
| JP | 2966007 B2 | 5/1990 |
| JP | 07-501271 A | 2/1995 |
| JP | 08-508684 A | 9/1996 |
| JP | 10-509097 A | 9/1998 |
| JP | 2002-066812 A | 3/2002 |
| JP | 2004-106150 A | 4/2004 |
| JP | 2004-216510 A | 8/2004 |
| JP | 2006-110666 A | 4/2006 |
| JP | 2006-272548 A | 10/2006 |

OTHER PUBLICATIONS

Supplementary European Search Report dated Jan. 31, 2012, issued for the corresponding European patent application No. 09808091.4.

* cited by examiner

CUTTING INSERT

TECHNICAL FIELD

The present invention relates to a cutting insert which is attached to an insert-detachable turning tool and is capable of reliably controlling chips during light cutting from medium cutting with relatively large cutting amount to finish cutting with small cutting amount.

The present application claims right of priority from the Patent Application No. 2008-214320 filed on Aug. 22, 2008 and the Patent Application No. 2009-186448 filed on Aug. 11, 2009, the content of which is incorporated herein by reference.

BACKGROUND ART

A cutting insert capable of performing chip control over a wide range from the above-described medium cutting to the finish cutting has been proposed, for example, in Patent Document 1. In the cutting insert, a breaker groove along a cutting edge is formed on a rake face, and a protrusion on a boss surface extends at a corner edge of the cutting edge. The leading end of the protrusion assumes a concave shape so as to enclose the corner edge, when viewed from above. An erecting surface with an erecting angle of 10° to 30° which projects from two top portions of the thus concaved protrusion to the vicinity of the cutting edge so as to be the longest length is formed at the cutting insert. The erecting surface is formed so as to be further away from the cutting edge, as the erecting surface extends away from the corner edge.

Further, particularly, in order to control chips during finish cutting in which depth of the cut is small, the cutting insert proposed in Patent Documents 2 and 3 is provided with an indentation near a corner edge on a rake face. At a region opposite to the corner edge of the indentation, an inclined surface which serves as a breaker and a rib are provided.
Prior Art Documents
Patent Documents
  Patent Document 1: Japanese Published Unexamined Patent Application No. 2006-272548
  Patent Document 2: Japanese Patent No. 2966007
  Patent Document 3: Japanese Published Unexamined Patent Application No. 2004-216510

SUMMARY OF THE INVENTION

Problems to be Solved by the Invention

However, with the cutting insert described in Patent Document 1, since the erecting surface projects to the rake face near the cutting edge from two top portions of the protrusion, the erecting surface inclines steeply, depending on a protrusion height up to the top portions of the protrusion and a space between the top portions and the cutting edge, making it difficult to form the above-described erecting angle. Thereby, during the medium cutting process in which depth of the cut is relatively large, there is a risk that the erecting surface wears away early due to contact with chips to reduce the service life of an insert. On the other hand, when a protrusion height itself up to the top portions of the protrusion is decreased for keeping the erecting angle within the above-described range, chips flow over the protrusion to flow out during the finish cutting process in which depth of the cut is small, thus resulting in a failure of smooth control of the chips.

Further, in the cutting insert described in Patent Documents 2 and 3, it is possible to treat chips smoothly during the finish cutting process in which depth of the cut is small. However, during the medium cutting process in which depth of the cut is relatively large, chips pass over the indentation to collide with the inclined surface and the rib, thus resulting in a failure of stable control of the chips. In particular, in the cutting insert described in these Patent Documents 2 and 3, the indentation is formed approximately in a circular shape according to a radius of a corner edge, when the rake face is viewed from above. Therefore, with a decrease of the radius of the corner edge, the indentation itself is also made small. When the cutting insert having the cutting edge including the above-described corner edge with a small radius is used, it is also difficult to reliably control chips during extremely shallow cutting process.

The present invention has been made in view of the above-described circumstances, an object of which is to provide a cutting insert which will harm smooth control of chips, when the cutting insert having a cutting edge including a corner edge with a small radius as described above is used to perform the extremely shallow cutting and finish cutting, and which can also be thereby used during the medium cutting process for a long time.

Means for Solving the Problem

A cutting insert of the present invention is provided with an insert main body having a rake face, a cutting edge which is formed at a circumferential edge of the rake face of the insert main body to have a corner edge and two side edges arranged on both sides of the corner edge, a protrusion portion which is formed on the rake face inside the corner edge so as to protrude, with a space kept between the cutting edges, and a pair of convex portions formed from a wall surface of the protrusion portion to the rake face so as to extend out to the side edges on both sides divided by a bisector of the corner edge.

Each of the pair of convex portions is provided with a first wall surface and a second wall surface, the first wall surfaces extend so as to extend away gradually from each other toward the cutting edge from the wall surface of the protrusion portion, each facing the corner edge of the cutting edge, the second wall surface contacts the first wall surface, facing the side edge continuing to an end of the corner edge.

The first and the second wall surfaces are inclined surfaces inclining toward the rake face as they extend away from a ridge line between both wall surfaces, and the ridge line is in contact with the wall surface of the protrusion portion at a position lower than the top portion of the protrusion portion closer to the corner edge.

On the rake face closer to the corner edge than the pair of convex portions, a recess which has a rear wall portion extending so as to cross the bisector in the middle between the corner edge and the convex portion and which is recessed with respect to the corner edge is formed.

Of the pair of convex portions, one convex portion is provided with a first wall surface which faces the corner edge and extends from the wall surface to one of the side edges, and a second wall surface which faces the one of the side edges and is in contact with the first wall surface along a ridge line. The other convex portion is provided with a first wall surface which faces the corner edge and extends from the wall surface to the other of the side edges, and a second wall surface which faces the other of the side edges and is in contact with the first wall surface along the ridge line.

The first and the second wall surfaces at the one convex portion incline toward the rake face as they extend away from the ridge line, whereas the first and the second wall surfaces at the other convex portion incline toward the rake face as they extend away from a ridge line.

The respective ridge lines of the one convex portion and the other convex portion are in contact with the wall surface at a position lower than the top portion of the protrusion portion closer to the corner edge. On the rake face closer to the corner edge than these two convex portions, a recess which is recessed with respect to the corner edge is formed. At the recess, a rear wall portion which spread so as to cross the bisector between the corner edge and these two convex portions is provided.

In the thus constituted cutting insert, where the radius of the corner edge is small, chips generated during the extremely shallow cutting process by using the corner edge are guided into the recess formed closer to the corner edge than the pair of convex portions, thereby colliding with the rear wall portion of the recess arranged so as to pass across the bisector in the middle between the corner edge and the convex portion. Therefore, even where the radius of the corner edge is small, a space between the corner edge and the rear wall portion is secured, thus making it possible to reliably control the chips from the extremely shallow cutting process.

Further, chips generated around the corner edge of the cutting edge during finish cutting in which the depth of the cut is larger than the depth of the cut in extremely shallow cutting process but which is smaller than the depth of the cut in medium cutting flow over the recess and flow out between the first wall surfaces of the pair of convex portions. Then, the chips are guided by these first wall surfaces to collide with the wall surface of the protrusion portion, and are thereby curled by resistance and controlled accordingly.

Here, in the convex portion, a ridge line between the first and the second wall surfaces is in contact with the wall surface of the protrusion portion at a position lower than the top portion of the protrusion portion closer to the corner edge. That is, a protrusion height of the top portion of the protrusion portion is made higher than a contact point of the wall surface of the protrusion portion with the ridge line. Therefore, it is possible to prevent chips generated during finish cutting from not being curled and going beyond the protrusion portion to flow out.

Still further, during medium cutting in which the depth of the cut is relatively larger than the depth of the cut in finish cutting, chips are generated from the corner edge to the one of the side edges continuing to the corner edge. The thus generated chips are in contact with the second wall surface of the convex portion closer to the one of the side edges continuing to the corner edge. However, in the above-constituted cutting insert, as described above, the ridge line between the second wall surface and the first wall surface is in contact with the wall surface of the protrusion portion at a position lower than the top portion of the protrusion portion. Thus, it is possible to decrease an angle of the second wall surface toward the rake face, irrespective of a protrusion height of the top portion and a space between the cutting edges.

Therefore, in the above-constituted cutting insert, it is possible to reduce resistance caused by contact of chips during medium cutting. Further, the convex portion is that which extends out from the wall surface of the protrusion portion. Therefore, a sufficient thickness of the convex portion is kept at the second wall surface closer to the protrusion portion. It is, thus, possible to suppress abrasion of the convex portion and control the chips stably over a long time. Further, since the wall surface of the protrusion portion is erected at the second wall surface closer to the protrusion portion, the chips in contact with the second wall surface are allowed to collide with the wall surface of the protrusion portion and be reliably controlled.

Here, the above-described recess may have a pair of front wall portions extending along the side edge continuing the both ends of the corner edge. The rear wall portion of the recess may extend toward the corner edge in a direction along the bisector, as approaching to both ends from the central part located on the bisector, and may be connected to the front wall portion.

That is, in the cutting insert of the present invention, the recess may be provided with one of the front wall portions extending along the one of the side edges continuing to the corner edge and the other of the front wall portions extending along the other of the side edges continuing to the corner edge. Then, the rear wall portion may gradually approach to the corner edge as it extends toward the one of the side edges from the bisector and be connected to the one of the front wall portions. Also, the rear wall portion comes closer to the corner edge toward the other of the side edges from the bisector and may be connected to the other of the front wall portions.

Thereby, it is also possible to increase the width of the recess in a direction orthogonal to the bisector and it is possible to secure dimensions necessary for the recess, even if the corner edge is decreased in radius as described above. Further, the rear wall portion can be disposed so as to oppose a direction of which chips generated by the corner edge flow out, thereby making it possible to control the chips more reliably.

The protrusion height of the rear wall portion of the recess may be lower than the height at a contact point where a ridge line between the first wall surface and the second wall surface of the convex portion is in contact with the wall surface of the protrusion portion. That is, the rear wall portion may be formed at a position which is lower than a contact point where the wall surface is in contact with the ridge line of the one convex portion and also lower than a contact point where the wall surface is in contact with the ridge line of the other convex portion.

Where the height of the rear wall portion is higher than the contact point with the protrusion portion of the convex portion, there is a drawback that chips generated during finish cutting are blocked by the rear wall portion and not guided between the first wall surfaces of the pair of convex portions.

The top portion of the protrusion portion may be formed in a multi-stage shape in which the opposite side of the corner edge protrude via a step portion with respect to the corner edge. That is, the step portion may be provided at the top portion of the protrusion portion which faces the corner edge.

Thereby, it is possible to prevent the protrusion height of the top portion of the protrusion portion close to the corner edge from being excessively high and also prevent a tendency of clogging of chips during finish cutting, by which resistance caused by chips can be reduced. Further, the step portion opposite to the corner edge can be used to reliably control chips during medium cutting.

On the other hand, a part between the first wall surfaces of the pair of convex portions may be formed in such a manner that the rake face extends directly from the corner edge of the cutting edge. On the rake face inside the corner edge, a rib portion which is narrower in width than the space between these first wall surfaces and lower in protrusion height than the convex portion is formed along the bisector between the first wall surfaces of the pair of convex portions, and the rib portion close to the corner edge may be connected to the rear wall portion of the recess.

That is, the cutting insert of the present invention may be provided with a rib portion formed on the rake face between the two first wall surfaces. Then, the rib portion may extend along the bisector, the end close to the corner edge being in contact with the rear wall portion, the rib portion may be lower than either of the two convex portions, and the width of the rib portion may be narrower than a space between the first wall surface of the one convex portion and the first wall surface of the other convex portion.

Thereby, the rib portion can be used for controlling chips not only generated during simple turning, but also particularly generated during finish cutting of copy turning.

Chips which flow over the recess during finish cutting of simple turning and flow out along the bisector of the corner edge, or chips which flow out along the bisector as they changed a flowing direction during finish cutting of copy turning flow over a protruded ridge portion which is a roof of the rib portion, thereby scraping and passing over the protruded ridge portion. In this instance, the chips are curled by receiving resistance and colliding with one or the other of the first wall surfaces of the pair of convex portions located on the both sides of the rib portion. Thus, the chips are fragmented and controlled while the flow out direction of the chips is controlled.

Further, chips which are generated by the cutting edge during finish cutting of copy turning from the corner edge in a certain range on one or the other side of the bisector flow out inside the rake face while scraping and passing over the rake face from the one side, colliding with a side face of the rib portion. In this instance, the chips are curled by resistance during scraping and passing over the rake face, and the flow out direction of the chips is controlled by the side surface of the rib portion. Still further, even in the copy turning or in the above-described simple turning, when the feeding speed is high, the chips from the rib portion collide with the wall surface of the protrusion portion inside of the rib portion, or one or the other of the first wall surfaces of the pair of convex portions, so the chips can be reliably controlled.

Effects of the Invention

As described above, according to the present invention, the controllability of the chips during finish cutting in which depth of the cut is relatively small can be secured by the pair of convex portions and the protrusion portion. Further, chips generated during extremely shallow cutting process can be satisfactorily controlled by the recess which is closer to the corner edge than the pair of convex portions. Still further, chips generated during medium cutting in which depth of the cut is relatively large are controlled stably by the pair of convex portions, thus making it possible to suppress abrasion of the convex portions. It is, thereby, possible to provide the cutting insert with a longer service life and which is capable of being used to control chips stably over a long period of time.

MODE FOR CARRYING OUT THE INVENTION

Figure 1:
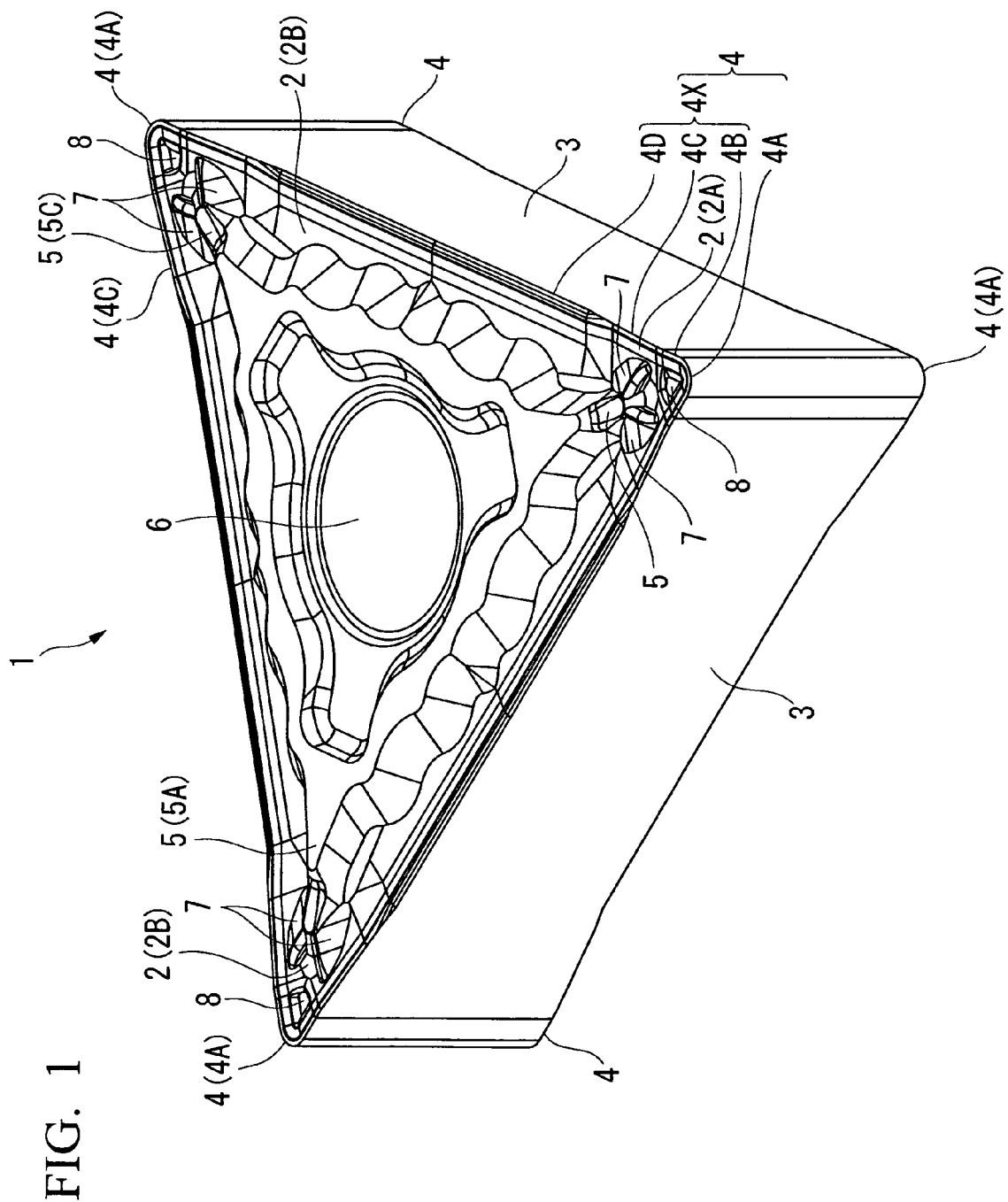
FIG. 1 is a perspective view which shows a first embodiment of the present invention.
Figure 2:
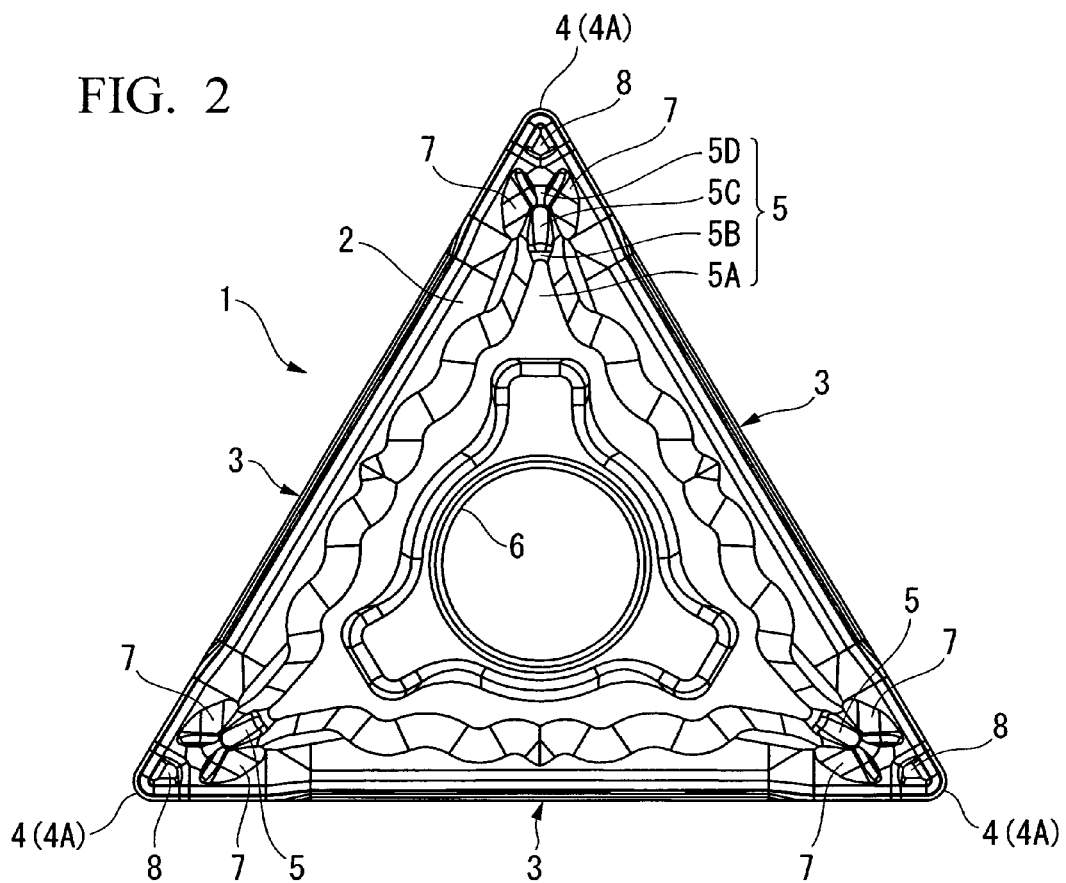
FIG. 2 is a plan view which shows the first embodiment in FIG. 1 viewed from the thickness direction of an insert main body 1.
Figure 3:
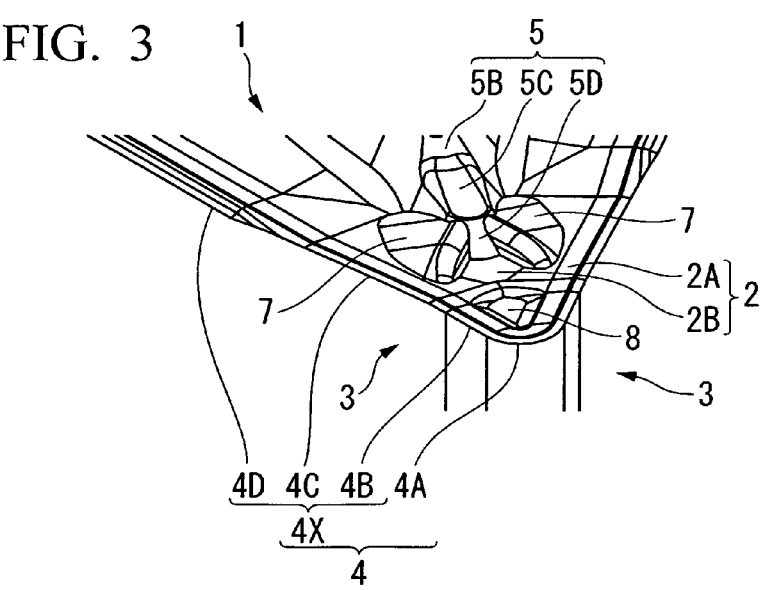
FIG. 3 is an enlarged perspective view showing a periphery of a corner edge 4A of a cutting edge 4 in the first embodiment shown in FIG. 1.

FIG. 1 to FIG. 8 show the first embodiment of the present invention. An insert main body 1 is formed in a polygonal flat plate-like shape (in particular, in the present embodiment, in an equilateral triangle flat plate-like shape) by a hard material such as cemented carbide. Two equilateral triangle-like rake faces 2 are formed on the both sides of the insert main body 1. Three flank faces 3 arranged around these two rake faces 2 are parallel to the thickness direction of the insert main body 1 (the up-down direction in FIG. 5 to FIG. 8) and perpendicular to the rake faces 2. The cutting insert of the present embodiment is a so-called negative type cutting insert. The insert main body 1 is formed in such a manner that the pair of equilateral triangle surfaces are an inversion symmetry in obverse and reverse and formed in a 120° rotational symmetry shape with respect to the center line of the equilateral triangle surface. Further, the insert main body 1 is formed in a symmetrical shape with respect to a flat surface parallel with the thickness direction including a bisector (bisector L to be described later) of each corner of the equilateral triangle.

A cutting edge 4 is formed at a circumferential edge of the rake face 2 in contact with the flank 3. The cutting edge 4 which is positioned at each corner of the equilateral triangle-like rake face 2 is provided with a corner edge 4A which is positioned at the apex of the corner and two side edges 4X which are arranged on both sides of the corner edge 4A.

The corner edge 4A is formed in a convex circular arc shape when the insert main body 1 is viewed from above in the thickness direction and also extends perpendicularly with respect to the thickness direction of the insert main body 1. Further, each of the two side edges 4X is provided with a pair of tangent portions 4B extending as tangent lines of the corner edges 4A from each end of the corner edges 4A when viewed from above and also extending so as to be flush with the corner edge 4A in the thickness direction, a pair of inclined portions 4C continuing from the tangent portions 4B and inclining so as to gradually sink down in the thickness direction in a linear fashion as they extend away from the corner edge 4A, and a straight line portion 4D continuing from the tangent portions 4B and the inclined portions 4C on a straight line and also extending perpendicularly in the thickness direction, when viewed from above, on the opposite side to the corner edge 4A over the inclined portions 4C.

Further, on the rake face 2 inside the cutting edge 4 including the corner edge 4A, a protrusion portion 5 is formed so as to be separated from the cutting edge 4 and protrude from the rake face 2 in the thickness direction. The protrusion portion 5 is provided with a first top portion 5A, a second top portion 5C and a wall surface 5D. The first top portion 5A is a flat surface perpendicular to the thickness direction. The first top portion 5A protrudes in the thickness direction so as to be higher than the cutting edge 4. The protrusion height of the first top portion 5A is the highest in the protrusion portion 5. From the first top portion 5A toward each of the corner edges 4A of the cutting edge 4, the second top portion 5C sinks in one step via the step portion 5B from the first top portion 5A in the thickness direction. The height of the second top portion 5C is made slightly lower than the height of cutting edge 4 at the corner edge 4A. The second top portion 5C is also a flat surface perpendicular to the thickness direction. The wall surface 5D inclines so as to be gradually higher in the thickness direction as the wall surface 5D extend away from the corner edge 4A and approaches the second top portion 5C. Still further, a mounting hole 6 is opened into the first top portion 5A. The mounting hole 6 is formed so as to penetrate through the insert main body 1 in the thickness direction at the center of the rake face 2.

Figure 4:
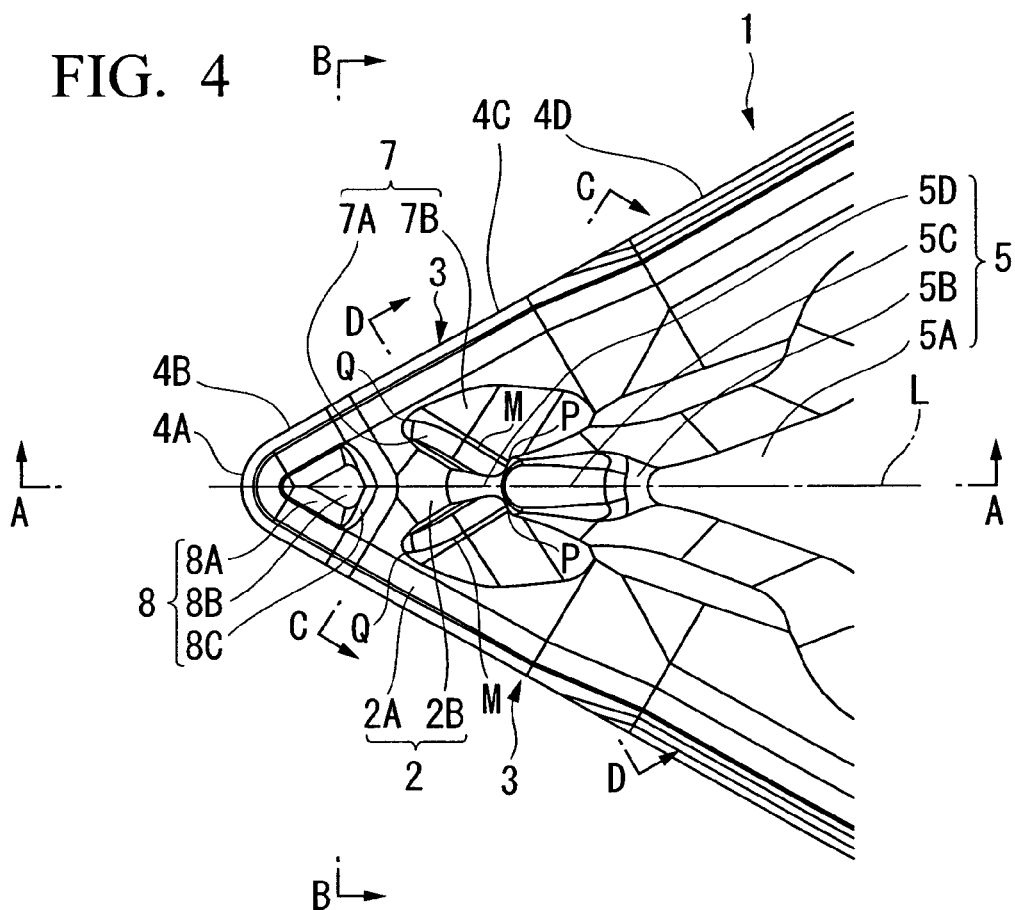
FIG. 4 is an enlarged plan view which shows a periphery of the corner edge 4A of the cutting edge 4 in the first embodiment shown in FIG. 1.

The protrusion portion 5 is formed so as to taper toward the corner edge 4A as shown in FIG. 4, when the insert main body 1 is viewed from above in the thickness direction. A part facing the corner edge 4A on the wall surface 5D along a bisector L of the corner edge 4A (a bisector of each corner of an equilateral triangle formed by the rake faces 2) and the above-described step portion 5B are formed as a convex-curved surface which is formed in an inclined cylindrical surface shape or in a circular truncated cone surface shape, the diameter of which is gradually reduced toward the first top portion 5A and the second top portion 5C and is curved along the corner edge 4A. The heights of this part and the step portion 5B are being gradually higher as they extend away from the corner edge 4A, as described above. In contrast, the wall surface 5B part inside the inclined portion 4C and the straight line portion 4D of the cutting edge 4 is formed as an inclined surface. In a direction along the inclined portion 4C and the straight line portion 4D, the inclined surface of the wall surface 5B part is formed gradually higher toward the first top potion 5A as it extend away from the corner edge 4A, and has alternately disposed convexly vault convex-curved surfaces and concavely vault concave-curved surfaces.

Further, A part of the rake face 2 close to the cutting edge 4 is formed as a positive rake face 2A via a flat land between the cutting edges 4. The positive rake face 2A sinks in gradually toward the inside thereof in a cross section orthogonal to the cutting edge 4. At the inclined portion 4C of the cutting edge 4, the positive rake face 2A also inclines according to an inclination of the cutting edge 4. Still further, at a part continuing from the straight line portion 4D in the cutting edge 4, a flat rake face 2B is formed as a flat surface perpendicular to the thickness direction further inside than the positive rake face 2A. The flat rake face 2B is in contact with an external edge of the wall surface 5D of the protrusion portion 5.

On the other hand, a pair of convex portions 7 are formed from the wall surface 5D of the protrusion portion 5 to the rake face 2 in a periphery of the corner edge 4A so as to extend out to the cutting edge 4 on the both sides divided by the bisector L of the corner edge 4A. Each of these convex portions 7 is constituted with a first wall surface 7A and a second wall surface 7B. The first wall surface 7A faces the corner edge 4A. The first wall surfaces 7A facing each other and gradually extend away from each other as approaching to the cutting edge 4 from the wall surface 5D of the protrusion portion 5. The first wall surface 7A extends to an end of the tangent portion 4B of the cutting edge 4 opposite to the corner edge 4A. The second wall surface 7B in contact with the first wall surface 7A via a ridge line M. Each of the second wall surfaces 7B extending to the respective inclined portion 4C of cutting edge 4 mutually opposite for the pair of convex portions 7. The ridge line M part is chamfered and the corners are rounded off.

Further, a contact point P at which the ridge line M is in contact with the wall surface 5D of the protrusion portion 5 is arranged at a position slightly lower in the thickness direction than the second top portion 5C closer to the corner edge 4A of the protrusion portion 5. That is, the convex portion 7 is, as a whole, made lower in protrusion height than the second top portion 5C of the protrusion portion 5 particularly closer to the corner edge 4A in the thickness direction. Still further, in the circumferential direction of the wall surface 5D, the respective contact points P of the pair of convex portions 7 are positioned on the side of the convex-curved surface near a part where the convex-curved surface part facing the corner edge 4A is consecutively connected with a part extending inside the inclined portion 4B. The convex-curved surface part formed in a cylindrical surface shape in which the wall surface 5D at the leading end of the protrusion portion 5 inclines or a circular truncated cone surface shape is remained so as to extend along the bisector L between the both first wall surfaces 7A of these convex portions 7.

Figure 7:
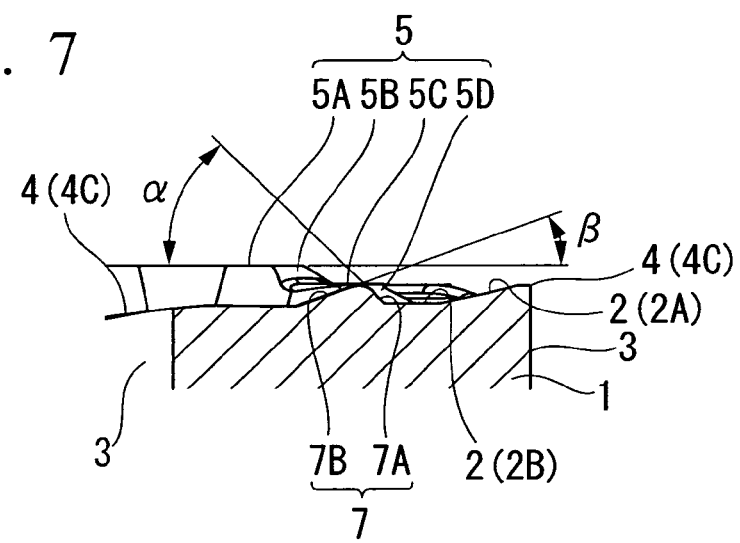
FIG. 7 is a cross sectional view taken along line C to C in FIG. 4 (a cross section orthogonal to a ridge line M).

In the present embodiment, as shown in FIG. 4, the first wall surface 7A extends out to a positive rake face 2A inside the inclined portion 4C from parts on the sides of both ends of the convex-curved surface part in a curved direction on the wall surface 5D of the protrusion portion 5. The first wall surface 7A is separated from the tangent portion 4B of the cutting edge 4. A ridge line M contact the positive rake face 2A at a contact point Q. Here, the first wall surface 7A is formed as an inclined flat surface which inclines at a constant inclination angle $\alpha$ to a direction perpendicular to the thickness direction toward the ridge line M from the rake face 2 in a cross section orthogonal to the ridge line M, as shown in FIG. 7. The rake face 2 between these first wall surfaces 7A of the pair of convex portions 7 is formed as the flat rake face 2B perpendicular to the thickness direction.

On the other hand, the second wall surface 7B extends out to the positive rake face 2A inside the inclined portion 4C from the wall surface 5D continuing to the second top portion 5C of the protrusion portion 5 inside the inclined portion 4C of the cutting edge 4. In a cross section orthogonal to the ridge line M, as shown in FIG. 7, the second wall surface 7B is formed as an inclined flat surface which inclines at a constant inclination angle $\beta$ to a direction perpendicular to the thickness direction, as the second wall surface 7B is spaced away from the ridge line M. Further, the inclination angle $\beta$ is made smaller than the inclination angle $\alpha$ of the first wall surface 7A. As shown in FIG. 4, the second wall surface 7B is gradually increased in width in a direction orthogonal to the ridge line M toward a direction spaced away along the inclined portion 4C from the both ends of the corner edge 4A, and a space between the cutting edge 4 (the inclined portion 4C) and a ridge line formed with the positive rake face 2A is also gradually increased.

Further, the ridge line M is formed in a straight line in which a part on the side of the contact point Q is convexly curved forming a circular arc shape from the rake face 2 and a part on the side of the contact point P extends perpendicularly to the thickness direction smoothly in contact with a circular arc on the side of the contact point Q. The second wall surface 7B is also formed in a convex-curved surface such as a cylindrical surface which is curved so as to be convexly curved along the ridge line M, while inclining at the inclination angle on the side of the contact point Q or a circular conical surface. At a part from the convex-curved surface to the contact point P, the second wall surface 7B is formed in an inclined flat surface which is smoothly in contact with the convex-curved surface, extending in a direction perpendicular to the thickness direction in the direction of the ridge line M, while inclining at the inclination angle β. The protrusion height of the contact point P in the thickness direction is made approximately equal to a height of the cutting edge 4 at the corner edge 4A. Therefore, the ridge line M forms approximately a half ellipse shape dividing an ellipse along a long axis direction, when viewed from a direction opposing to the first wall surface 7A. The protrusion height of the contact point P is higher than the protrusion height of the contact point Q.

Figure 8:
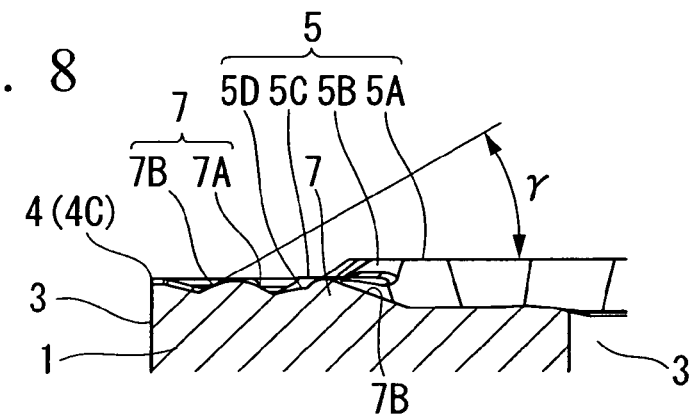
FIG. 8 is a cross sectional view taken along line D to D in FIG. 4 (a cross section orthogonal to an inclined portion 4C of the cutting edge 4 when viewed from above in the thickness direction).
Figure 9:
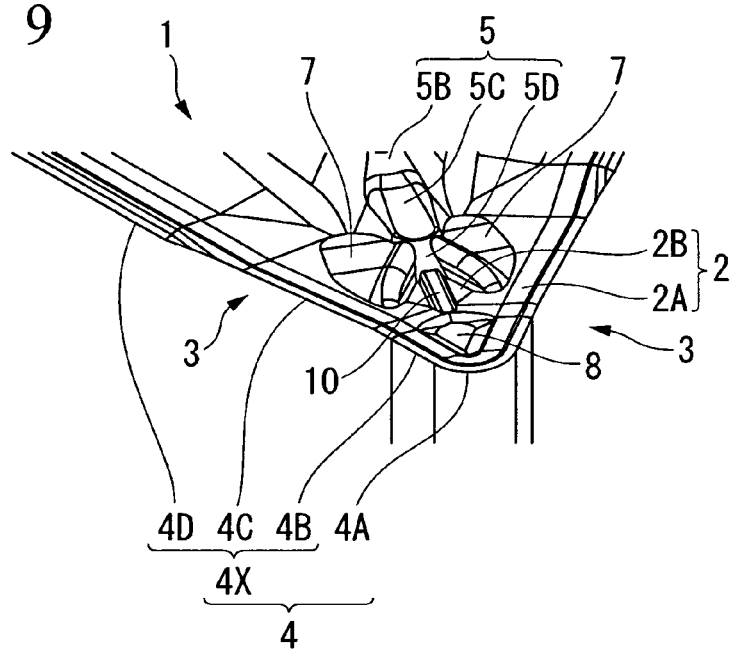
FIG. 9 is an enlarged perspective view showing a periphery of a corner edge 4A of a cutting edge 4 in a second embodiment of the present invention.
Figure 10:
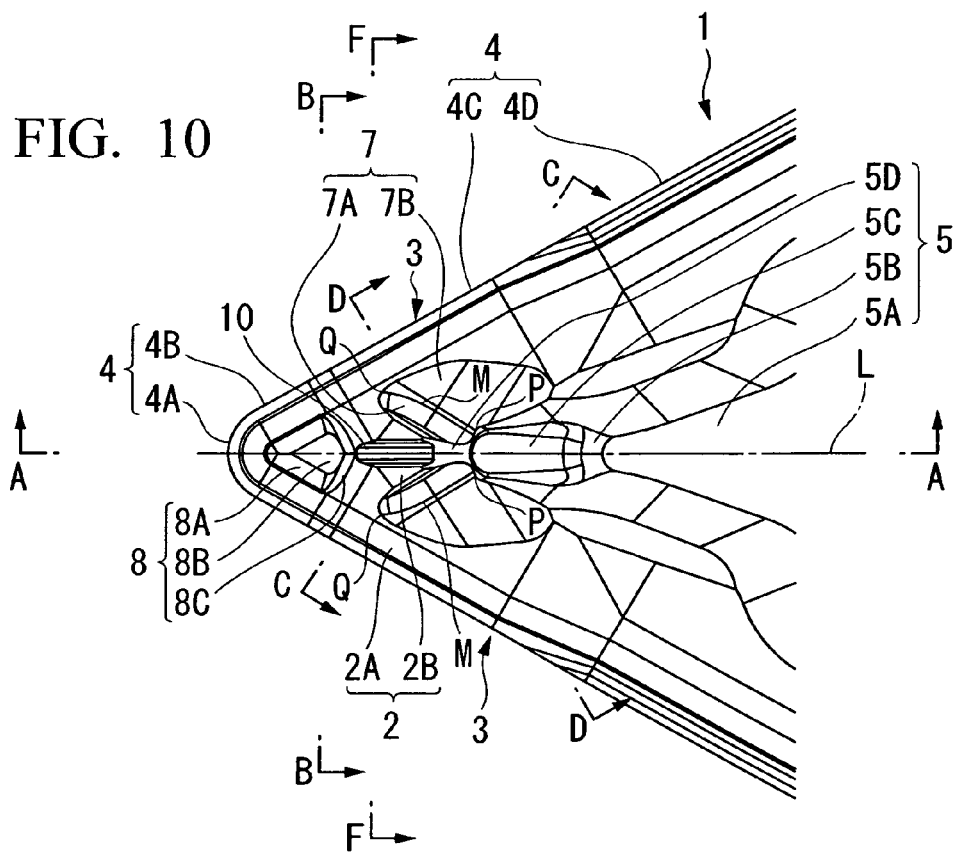
FIG. 10 is an enlarged plan view which shows a periphery of the corner edge 4A of the cutting edge 4 of the second embodiment in FIG. 9.

Still further, as shown in FIG. 8, the second wall surface 7B inclines so as to sink in gradually also in a cross section orthogonal to the inclined portion 4C of the cutting edge 4, as the second wall surface 7B extend away from the ridge line M. However, since the part on the side of the contact point Q is a convex-curved surface as described above, an inclination angle of this cross section is gradually increased toward the rake face 2. Then, also on a line of intersection between the second wall surface 7B and the rake face 2 on which the inclination angle to be maximized, an inclination angle γ of the second wall surface 7B in the cross section is made smaller than an inclination angle α of the first wall surface 7A in a cross section orthogonal to the ridge line M, as shown in FIG. 7. Therefore, the inclination of the second wall surface 7B at any portion in a cross section orthogonal to the cutting edge 4 become more gentle than the inclination of the first wall surface 7A in the cross section orthogonal to the ridge line M.

Then, on the rake face 2 closer to the corner edge 4A of the cutting edge 4 than the pair of convex portions 7, a recess 8 which sink in more than a protrusion height of the cutting edge 4 at the corner edge 4A in the thickness direction, and recessed with respect to the cutting edge 4 is formed. As shown in FIG. 4, the recess 8 is constituted with a pair of front wall portions 8A extending parallel to the tangent portion 4A of the side edge 4X continuing to the corner edge 4A approximately from the center of an arc formed by the corner edge 4A, a bottom surface 8B positioned between these front wall portions 8A, and a rear wall portion 8C on the opposite side of the corner edge 4A of the bottom surface 8B, standing from the bottom surface 8B, positioned in the middle portion which is approximately at the center between the corner edge 4A of the cutting edge 4 and the contact point Q of the pair of convex portions in the direction of the bisector L, and extending so as to pass across the bisector L.

Figure 5:
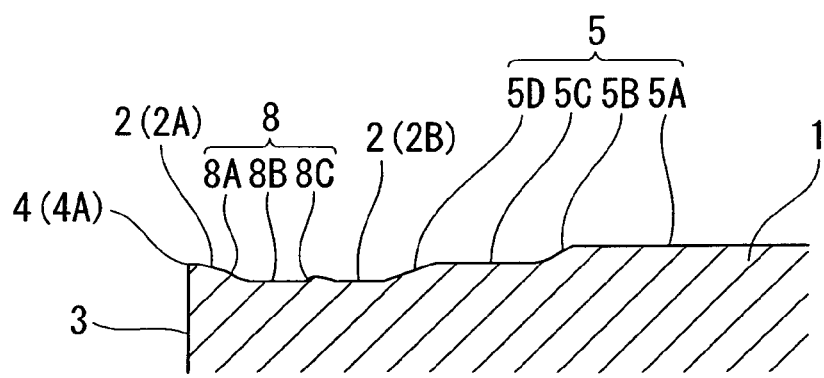
FIG. 5 is a cross sectional view taken along line A to A in FIG. 4.
Figure 6:
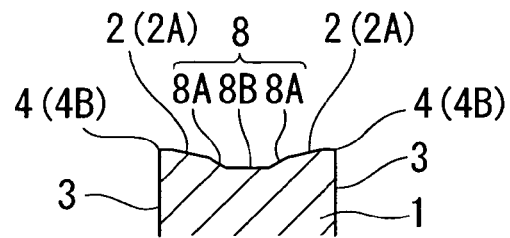
FIG. 6 is a cross sectional view taken along line B to B in FIG. 4.

As shown in FIG. 5, in the present embodiment, the bottom surface 8B is a flat surface perpendicular to the thickness direction and approximately be the same height with the flat rake face 2B formed between the first wall surfaces 7A of the pair of convex portions 7. The front wall portion 8A is an inclined flat surface which sink in to the thickness direction as the front wall portion 8A extend away from the cutting edge 4 at a inclination steeper than the positive rake face 2A continuing to the corner edge 4A and the tangent portion 4B of the cutting edge 4. Further, the rear wall portion 8C extends in a V-shape, when viewed from above, while being slightly recessed, and curved to the side edge 4X from its central portion positioned on the bisector L toward both ends of itself. The rear end portion 8C is connected to each of the front wall portions 8A. When viewed from above, a pinched angle of V-shape formed by the rear wall portion 8C is larger than a pinched angle formed by the pair of tangent portions 4B continuing to the corner edge 4A of the cutting edge 4 or a pinched angle formed by the facing first wall surfaces 7A of the pair of convex portions 7.

Further, the protrusion height of the rear wall portion 8C in the thickness direction from the bottom surface 8B is the highest at the central part of the bisector L and gradually lowered toward a part connect to the front wall portion 8A. However, in the thickness direction, even the highest protrusion height of the rear wall portion 8C at the central part thereof is made sufficiently lower than the height of the contact point P where the ridge line M of the convex portion 7 contacts the protrusion portion 5. Still further, the rear wall portion 8C is an inclined surface which rises gradually toward the opposite side of the corner edge 4A, and the inclination angle thereof with respect to the bottom surface 8B is made steeper than the inclination angle of the front wall portion 8A with respect to the bottom surface 8B. The back surface facing the opposite side of the corner edge 4C of the rear wall portion 8C is an inclined surface formed by extended positive rake face 2A continuing from the tangent portion 4B of the cutting edge 4. However, the inclination angle thereof with respect to the flat rake face 2B is made more gentle than the inclination angle of the rear wall portion 8C with respect to the bottom surface 8B of the recess 8.

In the thus constituted cutting insert, during medium cutting with relatively large cutting amount where the tangent portion 4B continuing from the corner edge 4A of the cutting edge 4 to one end of the corner edge 4A and the inclined portion 4C are used, chips flow out inside the rake face 2 from the corner edge 4A, the tangent portion 4B and the inclined portion 4C and are first in contact with the second wall surface 7B of the convex portion 7. Here, the second wall surface 7B of the convex portion 7 is formed in such a manner that the ridge line M with the first wall surface 7A is in contact with the wall surface 5D of the protrusion portion 5 at a contact point P lower than the second top portion 5C of the protrusion portion 5. Therefore, as compared with the cutting insert described in Patent Document 1 in which the contact point P is located in the same height with the top portion of the protrusion portion, an angle of the second wall surface 7B in a direction toward the rake face 2, for example, an inclination angle γ in a cross section orthogonal to the cutting edge 4 can be decreased, if a height of the second top portion 5C on the side of the corner edge 4 and a space between the cutting edge 4 and the second wall surface 7B are equal.

Therefore, according to the above-constituted cutting insert, it is possible to suppress resistance where chips scraping and passing over the second wall surface 7B in low value, even allowing chips generated during medium cutting contact the second wall surface 7B. Thus, it is possible to prevent the convex portion 7 from being abraded from the second wall surface 7B earlier, and makes it possible to provide a cutting insert with a longer service life. Further, since the convex portion 7 extends out from the wall surface 5D of the protrusion portion 5, the convex portion 7 can keep a sufficient thickness between the second wall surface 7B and the wall surface 5D of the protrusion portion 5. Therefore, it is possible to more reliably prevent the convex portion 5 from being abraded. On the other hand, the contact point P is disposed at a position lower than the second top portion 5C, by which the wall surface 5D of the protrusion portion 5 is erected at an angle steeper than the above-described angle inside the second wall surface 7B. Thereby, chips given a certain resistance by being in contact with the second wall surface 7B are further given the resistance by collision with the wall surface 5D and curled. Therefore, chip controllability is not lowered even during medium cutting.

Further, chips generated between the corner edge 4A of the cutting edge 4 and the tangent portion 4B during finish cutting in which the depth of the cut is smaller than the depth of the cut in the medium cutting scraping and passing over the rake face 2 inside the corner edge 4A and the tangent portion 4B, flow over the recess 8, flowing out between both first wall surfaces 7A of the pair of convex portions 7. Still further, the chips are guided along the bisector L or the first wall surface 7A, colliding with the convex-curved surface part of the wall surface 5B of the protrusion portion 5 facing the corner edge 4A and controlled by being curled by resistance from the wall surface 5B. In this instance as well, the second top portion 5C of the protrusion portion 5 is made slightly higher in protrusion height than the corner edge 4A and the convex portion 7. Even thin and extendish chips generated during finish cutting do not flow over the protrusion portion 5 to flow out, thus making it possible to control the chips reliably.

In particular, in the present embodiment, the first and the second top portions 5A, 5C of the protrusion portion 5 are formed in a multi-stage shape in which the corner edge 4A and the first top portion 5A on the opposite side of the corner edge 4A are protruded one step via the step portion 5B with respect to the second top portion 5C on the side of the corner edge 4A. Therefore, it is possible to prevent the height of the second top portion 5C from being higher than necessary and to avoid the tendency of chips from clogging result in an increased resistance. On the other hand, even if the slightly extended chips flow over the second top portion 5C, they will collide with the step portion 5B continuing the first top portion 5A. Thus, controllability of the chips is not lowered.

In case of extremely shallower depth of the cut than the depth of the cut of the finish cutting and chips with small width and small thickness generated by exclusive use of the corner edge 4A, the chips are guided inside the recess 8 closer to the corner edge 4A than the convex portion 7. The chips guided into the recess 8 are positioned in the intermediate portion between the corner edge 4A and the pair of convex portions 7, colliding with the rear wall portion 8C of the recess 8 extending so as to pass across the bisector L. Therefore, the chips generated during a finish cutting in which extremely shallow depth of the cut can also be curled by allowing them to collide with the rear wall portion 8C to give resistance. As a result, according to the above-constituted cutting insert, reliable chip controlment can be realized in a huge variety of cutting conditions.

Further, in the present embodiment, the recess 8 is provided with a front wall portion 8A extending along the tangent portion 4B of the side edge 4X continuing to the both ends of the corner edge 4A. The front wall portion 8A is formed so as to spread and extend from the corner edge 4A to the opposite side of the corner edge 4A in the direction of the bisector L. So, even the radius of a circular arc formed by the corner edge 4A viewed from above is small, the size of the recess 8 in a flow out direction of chips can be ensured. And, the rear wall portion 8C extends in a inverted V-shape from its central portion toward the corner edge 4A in the direction of the bisector L, when viewed from above. Thus, even if chips are generated at any part of the corner edge 4A, the rear wall portion 8C is arranged so as to face a flow out direction of the chips, allowing the chips to collide with the rear wall portion 8C. Therefore, it is possible to control the chips more reliably during cutting in which such shallow depth of the cut.

Further, even at the highest central portion of the rear wall portion 8C of the recess 8, the protrusion height is made lower than the contact point P where the ridge line M of the convex portion 7 contacts the protrusion portion 5. Therefore, chips generated during finish cutting from the corner edge 4A to the tangent portion 4B of the cutting edge 4 as described above are not caught at the rear wall portion 8C and do not block controlment of the chips. So, the chip control is never interfered with. That is, if the protrusion height of the rear wall portion 8C is higher than the height of the contact point P in the thickness direction, the chips generated during finish cutting which should flow over the recess 8 as described above may not be reliably guided between the first wall surfaces 7A of the pair of convex portions 7.

On the other hand, in the cutting insert of the present embodiment, at each of the convex portions 7, an inclination angle β of the second wall surface 7B in the cross section orthogonal to the ridge line M is smaller than an inclination angle α of the first wall surface 7A in the same cross section. Further, an inclination angle γ of the second wall surface 7B in a cross section orthogonal to the inclined portion 4C of the side edge 4X continuing to the both ends of the corner edge 4A is also made smaller than the inclination angle α, when viewed from above. Therefore, in particular during medium cutting, it is possible to more efficiently prevent wear of the convex portion 4 caused by chips generated by the side edge 4X continuing from both ends of the corner edge 4A. The inclination angle α shown in FIG. 7 is 45°, whereas the inclination angle γ shown in FIG. 8 is 29.883°.

Still further, in the second wall surface 7B, the part on the side of the contact point Q at which the ridge line M with the first wall surface 7A is in contact with the rake face 2 is given as a convex-curved surface, as described above. It is, therefore, possible to decrease an area in contact with chips which scraping and passing over the rake face 2 (the positive rake face 2A) generated by the inclined portion 4C of the cutting edge 4 during medium cutting. Also, it is possible to reduce the resistance from the chips and the wear of the rake face 2.

On the other hand, since the thickness of chips generated during finish cutting are small as described above, the first wall surface 7A rarely wears even with the large inclination angle α. Rather, by setting the inclination angle α lager than the inclination angles β and γ, it is possible to control the chips generated during the finish cutting so as to guide and collide the chips to the wall surface 5B facing the corner edge 4A of the protrusion portion 5. Further, in the present embodiment, the wall surface 5D facing the corner edge 4A of the protrusion portion 5 is formed as the convex-curved surface part which is curved along a curvature of the cutting edge 4 at the corner edge 4A. Therefore, even during finish cutting, it possible to reduce resistance from chips which were guided and collided.

Further, in the first embodiment, the rake face 2 inside the corner edge 4A and the tangent portion 4B of the cutting edge 4 are formed as the positive rake face 2A. And the rake face 2 between the first wall surfaces 7A of the pair of convex portions 7 is formed as the flat rake face 2B perpendicular to the thickness direction. Therefore, chips during finish cutting generated at the corner edge 4A and the tangent portion 4B to flow out along the positive rake face 2A are allowed to collide temporarily with the flat cutting surface 2B and are given a certain resistance, before collide to the first wall surface 7A and the wall surface 5D of the protrusion portion 5 therebetween. Thereafter, the chips collided with the wall surfaces 7A and 5D and curled. Therefore, it is possible to prevent such a situation that these chips get stuck since the chips from the positive rake face 2 collide directly with the wall surfaces 7A and 5D to receive large resistance.

Then, FIG. 9 to FIG. 15 show a second embodiment of the present invention. Constituents common to the first embodiment will be denoted with the same reference numerals and an explanation thereof is omitted.

In the second embodiment, on the rake face 2 inside the corner edge 4A of the cutting edge 4, as described above, a rib portion 10 narrower than a space between the first wall surfaces 7A and lower in protrusion height in the thickness direction than the contact point P of the convex portion 7 is formed along the bisector L at a part formed as the flat rake face 2B between the first wall surfaces 7A of the pair of convex portions 7. The rib portion 10 is connected to the rear wall portion 8C of the recess 8 at an end closer to the corner edge 4A.

Figure 11:
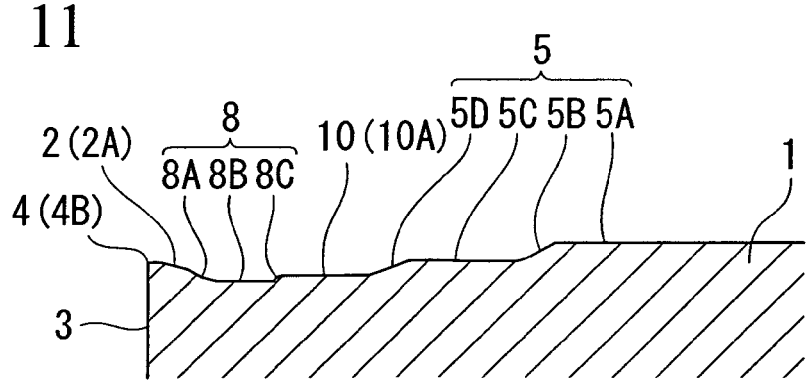
FIG. 11 is a cross sectional view taken along line A to A in FIG. 10.
Figure 12:
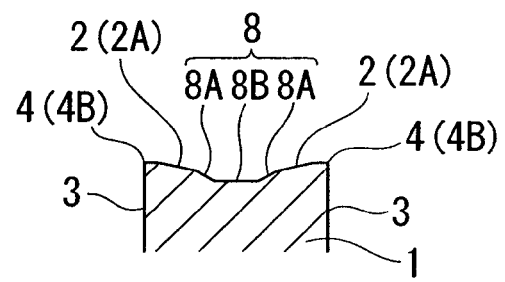
FIG. 12 is a cross sectional view taken along line B to B in FIG. 10.

The rib portion 10 extends from a position closer to the corner edge 4A than the contact point P of the convex portion 7 in the direction of the bisector L on the wall surface 5D of the protrusion portion 5 which is formed in a convex-curved surface shape and remained between the pair of convex portions 7. A width of the rib portion 10 is made slightly narrower than a space between these two first wall surfaces 7A, thus keeping a space between the rib portion 10 and both convex portions 7. Further, the protrusion height of the rib portion 10 in the thickness direction is lower than the contact point P of the convex portion 7 and, in the present embodiment, equal to the protrusion height of the rear wall portion 8C of the recess 8 and is formed in a constant height, as shown in FIG. 11.

Figure 13:
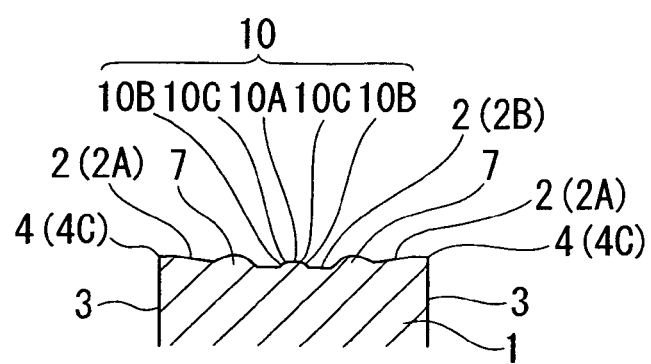
FIG. 13 is a cross sectional view taken along line F to F in FIG. 10.
Figure 14:
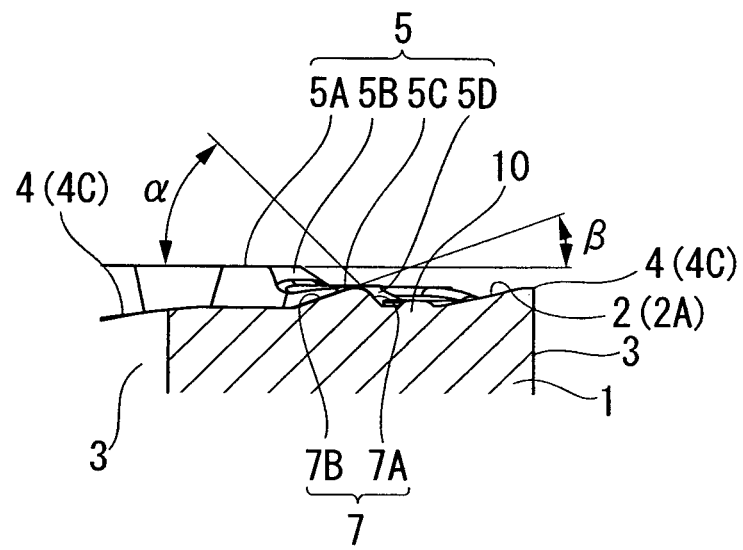
FIG. 14 is a cross sectional view taken along line C to C in FIG. 10 (a cross section orthogonal to the ridge line M).
Figure 15:
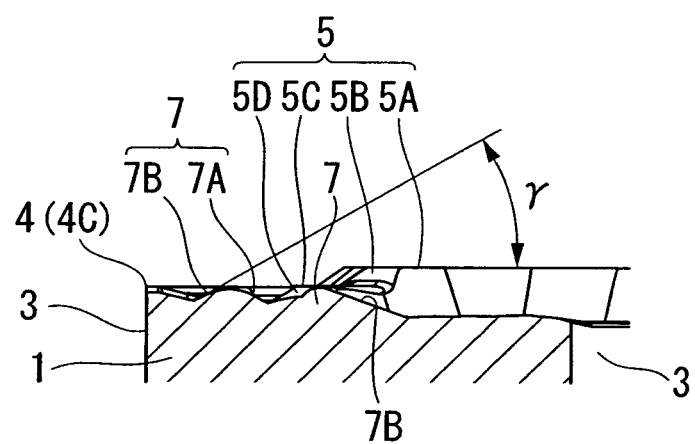
FIG. 15 is a cross sectional view taken along line D to D in FIG. 10 (a cross section orthogonal to the inclined portion 4C of the cutting edge 4, when viewed from above in the thickness direction).

Further, in a cross section orthogonal to the bisector L along the thickness direction, as shown in FIG. 13, the rib portion 10 of the present embodiment is formed in an isosceles trapezoid shape which tapers toward the tip in the thickness direction of a protruded ridge portion 10A which protrudes from the rake face 2. The protruded ridge portion 10A is a flat surface perpendicular to the thickness direction. A ridge line between the protruded ridge portion 10A and a side surface 10B of the tapered rib portion 10 is a protruded ridge line portion 10C having a circular-arc cross section which is smoothly in contact with the protruded ridge portion 10A and the side surface 10B.

The cutting insert of the second embodiment where the above-described rib portion 10 is formed is, as with the first embodiment, able to reliably control chips during from extremely low amount cutting as described above to finish cutting and medium cutting. Further, in particular, during finish cutting in which the corner edge 4A and the tangent portion 4B at the cutting edge 4 are mainly used and the cutting amount of which is smaller than medium cutting but not smaller than extremely low cutting, chips generated by the cutting edge 4 can be controlled by the rib portion 10 during not only simple turning where the insert main body 1 is fed parallel to the rotational axis line of a work piece but also copy turning where the insert main body 1 is fed in a direction other than a direction parallel to the rotational axis line copying the profile shape of the work piece.

That is, chips generated during such a cutting amount in finish cutting of simple turning flow over the recess 8 along the bisector L as described above, thus climb on the protruded ridge portion 10A of the rib portion 10 connected to the rear wall portion 8C of the recess 8. Then, these chips which have flowed onto the rib portion 10 are curled by frictional resistance when scraping and passing over the protruded ridge portion 10A, and colliding with one or the other of the pair of convex portions 7 higher in protrusion height than the rib portion 10 positioned on the both sides of the rake face 2 and positioned further inside the rake face 2 than the rib portion 8. This controls the flow direction of the chips, and the chips are curled and controlled. Further, even in large fed speed, the chips can be controlled by colliding the chips from the rib portion 10 with the convex-curved surface part of the wall surface 5B along the bisector L of the protrusion portion 5.

On the other hand, during finish cutting of copy turning, chips are generated at the cutting edge 4 from the corner edge 4A to the tangent portion 4B in a feeding direction and flow out on the rake face 2 inside the cutting edge 4 while changing the flow direction to the direction of bisector L by the movement of the insert main body 1 to the direction of bisector L. Meanwhile, the chips are given resistance and curled. Then, these chips which scraped and passed over the rake face 2 collide with the side surface 10B of the rib portion 10 lower than the convex portion 7 which is convexly formed on the bisector L. Therefore, the flow out direction of the chips is controlled without clogging and the chips are controlled.

Further, the rib portion 10 is made lower in protrusion height than the convex portion 7. Therefore, during medium cutting where the depth of the cut is larger than the depth of the cut in finish cutting of the above-described simple turning and the copy turning, the rib portion 10 is hardly involved in control of chips and the chips are exclusively controlled by the second wall surface 7B of the convex portion 7. However, since the rib portion 10 is formed in the second embodiment, even if the convex portion 7 might be abraded to disappear, it is possible to control the chips by allowing the chips generated during medium cutting to collide with the rib portion 10.

Therefore, according to the cutting insert of the second embodiment, it is possible to control the chips more reliably not only relatively large chips generated during medium cutting and chips generated during extremely shallow cutting process but also chips generated during finish cutting of simple turning and particularly copy turning. Thereby, it is possible to prevent a situation where chips are not sufficiently controlled and flow out direction of the chips becomes unstable and, for example, the chips are entangled on a tool body such as a cutting tool for retaining the insert main body 1 to unavoidably interrupt cutting work or the chips contact a finish-cut surface of a work piece and spoil the quality thereof.

Further, the protruded ridge portion 10A of the rib portion 10 is a flat surface perpendicular to the thickness direction. Therefore, in particular where chips which have flown out along the bisector L during a cutting such as a finish cutting of simple turning flow over, scraping and passing over the protruded ridge portion 10A, it is possible to increase the resistance given to the chips by enlarging the area at which the chips are in contact with the protruded ridge portion 10A. Thus, it is possible to curl and control the chips more reliably. On the other hand, a ridge line between the protruded ridge portion 10A and the side surface 10B of the rib portion 10 is formed as a protruded ridge line portion 10C, a cross section of which is formed in a circular arc shape. Thereby, for example, even if the way the chips from the side surface 10B collide with the protruded ridge line portion 10C is changed because of, for example, the change of the flow out direction of the chips accompanied by the copy turning, it is possible to keep providing stable resistance from the protruded ridge line portion 10C in a direction of a normal line at a contact point with the chips on the cross section. It is, thus, possible to control the chips more reliably and to control the chips.

Further, in the second embodiment, the rib portion 10 is formed approximately in a top down V-shape which tapers toward the protruded ridge portion 10A or in an isosceles trapezoid shape in a cross section orthogonal to the bisector L along the thickness direction. Thereby, a certain inclination can be given to the side surface 10B, and can form an obtuse angle with the rake face 2 which is formed as the flat rake face 2B between the pair of convex portions 7, for example, as shown in FIG. 13. Even where chips generated by the corner edge 4A in a feeding direction of the bisector L collide with the side surface 10B of the rib portion 10 from the rake face 2, particularly during finish cutting of copy turning, it is possible to prevent the chips, from being stuck at a corner where the rake face 2 is in contact with the side surface 10B and to control the chips more reliably.

However, for example, in a cutting insert exclusively used in copy turning, instead forming the protruded ridge portion 10A of the rib portion 10 as a flat surface perpendicular to the thickness direction as described above, the protruded ridge portion 10A may be, as a whole, formed as a protruded ridge line portion 10C having a convex-curve line shape such as a half circular arc in the cross section. Further, in a cutting insert exclusively used in simple turning, instead forming a ridge line between the protruded ridge portion 10A and the side surface 10B as protruded ridge line portion 10C as described above, the flat surface-like protruded ridge portion 10A may be in contact with the side surface 10B of the rib portion 10 so as to form a certain angle in the cross section, to secure flat surface area formed by the protruded ridge portion 10A.

Further, in the second embodiment, the rib portion 10 is formed in a peninsular shape which continues to the wall surface 5B of the protrusion portion 5 between the pair of convex portions 7 and extends from the protrusion portion 5 to the direction of the bisector L. However, the rib portion 10 may be formed in an isolated island shape so as to be spaced away from the protrusion portion 5, while extending in the direction of the bisector L. If the rib portion 10 is formed in an isolated island shape having a space between the protrusion portions 5 as described above, a length of the rib portion 10 in the direction of the bisector L can be shortened. Therefore, for example, where chips which are easily fragmented are generated depending on the quality of material of a work piece, it is possible to prevent providing undue resistance to the chips and suppress an increase in cutting resistance.

Still further, in the first and the second embodiments, a part between the pair of convex portions 7 is formed as the flat rake face 2B perpendicular to the thickness direction in the rake face 2. However, the part may be formed in such a manner that directly extending the positive rake face 2A extending from the cutting edge 4. Where the rake face 2 between the pair of convex portions 7 is formed as the positive rake face 2A as described above, the protrusion height of the protrusion portion 5, the convex portions 7, and the rib portion 10 from the positive rake face 2A can be further increased. It is, therefore, possible to further intensify resistance act to the chips and control the chips more reliably.

Industrial Applicability

The present invention relates to a cutting insert which is provided with an insert main body having a rake face, a cutting edge formed at a circumferential edge of the rake face of the insert main body to have a corner edge and two side edges arranged on the both sides of the corner edge, a protrusion portion formed on the rake face inside the corner edge to protrude, with a space kept between the cutting edges, and a pair of convex portions which are formed on both sides divided by a bisector of the corner edge from a wall surface of the protrusion portion to the rake face so as to extend out to the side edges. According to the present invention, it is possible to provide a cutting insert which can be used for a long time without diminishing smooth control of chips.

LIST OF REFERENCE NUMERALS

1: Insert main body
2: Rake face
2A: Positive rake face
2B: Flat rake face
4: Cutting edge
4A: Corner edge
4B: Tangent portion
4C: Inclined portion
4D: Straight line portion
4X: Side edge
5: Protrusion portion
5A: First top portion
5B: Step portion
5C: Second top portion
5D: Wall surface of protrusion portion
7: Convex portion
7A: First wall surface
7B: Second wall surface
8: Recess
8A: Front wall portion
8B: Bottom surface
8C: Rear wall surface
10: Rib portion
10A: Protruded ridge portion
10B: Side surface of rib portion
10C: Protruded ridge line portion
L: Bisector
M: Ridge line
P, Q: Contact point

The invention claimed is:

1. A cutting insert comprising:
an insert main body having a rake face;
a cutting edge formed at a circumferential edge of the rake face of the insert main body to have a corner edge and two side edges arranged on both sides of the corner edge;
a protrusion portion formed on the rake face inside the corner edge so as to protrude, with a space kept between the cutting edges; and
a pair of convex portions which are formed from a wall surface of the protrusion portion to the rake face so as to extend out to the side edges on both sides divided by a bisector of the corner edge; wherein
each of the pair of convex portions is provided with a first wall surface and a second wall surface, the first wall surfaces extending so as to separate gradually from each other toward the cutting edge from the wall surface of the protrusion portion, each first wall surface facing the corner edge of the cutting edge, the second wall surface contacting with the first wall surface and facing the side edge continuing from an end of the corner edge,
the first and the second wall surfaces are inclined surfaces inclining toward the rake face as they extend away from a ridge line between both wall surfaces,
the ridge line is in contact with the wall surface of the protrusion portion at a position lower than the top portion of the protrusion portion closer to the corner edge,
the rake face between the first wall surfaces of the pair of convex portions is formed as a flat rake face perpendicular to a thickness direction of the insert main body, on the rake face closer to the corner edge than the pair of convex portions, a recess which has a rear wall portion extending so as to cross the bisector in the middle between the corner edge and the convex portion and which is recessed with respect to the corner edge is formed, and the rear wall portion is an inclined surface which rises gradually toward the opposite side of the corner edge.

2. The cutting insert according to claim 1, wherein the recess has a pair of front wall portions extending along the side edge continuing to both ends of the corner edge and the rear wall portion of the recess extends to the corner edge in a direction along the bisector toward both ends from the center positioning on the bisector and is connected to the front wall portion.

3. The cutting insert according to claim 1, wherein a protrusion height of the rear wall portion of the recess is lower than a height of a point at which the ridge line between the first wall surface and the second wall surface of the convex portion is in contact with the wall surface of the protrusion portion.

4. The cutting insert according to claim 1, wherein the top portion of the protrusion portion is in a multi-stage shape in which the opposite side of the corner edge protrudes via a step portion with respect to the corner edge.

5. The cutting insert according to claim 1, wherein on the rake face inside the corner edge, a rib portion narrower in width than a space between these first wall surfaces and lower in protrusion height than the convex portion is formed along the bisector between the first wall surfaces of the pair of convex portions, and the rib portion is connected to the rear wall portion of the recess on the side of the corner edge.

6. The cutting insert according to claim 2, wherein a protrusion height of the rear wall portion of the recess is lower than a height of a point at which the ridge line between the first wall surface and the second wall surface of the convex portion is in contact with the wall surface of the protrusion portion.

7. The cutting insert according to claim 2, wherein the top portion of the protrusion portion is in a multi-stage shape in which the opposite side of the corner edge protrudes via a step portion with respect to the corner edge.

8. The cutting insert according to claim 3, wherein the top portion of the protrusion portion is in a multi-stage shape in which the opposite side of the corner edge protrudes via a step portion with respect to the corner edge.

9. The cutting insert according to claim 6, wherein the top portion of the protrusion portion is in a multi-stage shape in which the opposite side of the corner edge protrudes via a step portion with respect to the corner edge.

10. The cutting insert according to claim 2, wherein on the rake face inside the corner edge, a rib portion narrower in width than a space between these first wall surfaces and lower in protrusion height than the convex portion is formed along the bisector between the first wall surfaces of the pair of convex portions, and the rib portion is connected to the rear wall portion of the recess on the side of the corner edge.

11. The cutting insert according to claim 3, wherein on the rake face inside the corner edge, a rib portion narrower in width than a space between these first wall surfaces and lower in protrusion height than the convex portion is formed along the bisector between the first wall surfaces of the pair of convex portions, and the rib portion is connected to the rear wall portion of the recess on the side of the corner edge.

12. The cutting insert according to claim 4, wherein on the rake face inside the corner edge, a rib portion narrower in width than a space between these first wall surfaces and lower in protrusion height than the convex portion is formed along the bisector between the first wall surfaces of the pair of convex portions, and the rib portion is connected to the rear wall portion of the recess on the side of the corner edge.

13. The cutting insert according to claim 6, wherein on the rake face inside the corner edge, a rib portion narrower in width than a space between these first wall surfaces and lower in protrusion height than the convex portion is formed along the bisector between the first wall surfaces of the pair of convex portions, and the rib portion is connected to the rear wall portion of the recess on the side of the corner edge.

14. The cutting insert according to claim 7, wherein on the rake face inside the corner edge, a rib portion narrower in width than a space between these first wall surfaces and lower in protrusion height than the convex portion is formed along the bisector between the first wall surfaces of the pair of convex portions, and the rib portion is connected to the rear wall portion of the recess on the side of the corner edge.

15. The cutting insert according to claim 8, wherein on the rake face inside the corner edge, a rib portion narrower in width than a space between these first wall surfaces and lower in protrusion height than the convex portion is formed along the bisector between the first wall surfaces of the pair of convex portions, and the rib portion is connected to the rear wall portion of the recess on the side of the corner edge.

16. The cutting insert according to claim 9, wherein on the rake face inside the corner edge, a rib portion narrower in width than a space between these first wall surfaces and lower in protrusion height than the convex portion is formed along the bisector between the first wall surfaces of the pair of convex portions, and the rib portion is connected to the rear wall portion of the recess on the side of the corner edge.

* * * * *